(12) United States Patent
Viertel et al.

(10) Patent No.: US 6,273,489 B1
(45) Date of Patent: Aug. 14, 2001

(54) SUN VISOR ASSEMBLY

(75) Inventors: Lothar Viertel, Altforwciler (DE); Patrick Welter, La Chambre (FR)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/460,189

(22) Filed: Dec. 11, 1999

(30) Foreign Application Priority Data

Dec. 12, 1998 (DE) .............................................. 198 57 454

(51) Int. Cl.$^7$ ........................................................ B60J 3/00
(52) U.S. Cl. ............................................................ 296/97.9
(58) Field of Search ........................... 296/97.13, 97.12, 296/97.9; 248/278.1

(56) References Cited

U.S. PATENT DOCUMENTS

| | | | |
|---|---|---|---|
| 2,939,741 | * | 6/1960 | Keakting et al. ............ 296/97.13 |
| 4,610,477 | * | 9/1986 | Ebert et al. ................. 296/97.12 |
| 4,617,699 | * | 10/1986 | Nakamura ................. 296/97.9 X |
| 5,107,569 | * | 4/1992 | Hughes ....................... 296/97.13 X |
| 5,383,700 | * | 1/1995 | Argo et al. ................. 296/97.9 |
| 5,449,215 | * | 9/1995 | Viertel et al. ............. 296/97.9 |

FOREIGN PATENT DOCUMENTS

1006058 * 9/1965 (GB) ................................. 296/97.9

* cited by examiner

*Primary Examiner*—D. Glenn Dayoan
*Assistant Examiner*—Patricia Engle
(74) *Attorney, Agent, or Firm*—Foley & Lardner

(57) ABSTRACT

A sun visor for vehicles with a flat, long body has been described. A bearing device makes it possible to fold the body from an unused position into a first use position and to swivel it into a second use position. The bearing device includes an axle journal projecting from a corner of the sun visor body, a bearing housing receiving the axle journal with a swiveling journal aligned at an angle to the axle journal, a drag-bearing housing receiving the swiveling journal which can be fasted to the vehicle body, and means to axially fasten the bearing housing to the axle journal and the drag-bearing housing to the swiveling journal.

16 Claims, 3 Drawing Sheets

SUN VISOR ASSEMBLY

TECHNICAL FIELD OF THE INVENTION

The invention relates to a sun visor assembly with a flat, long body.

BACKGROUND OF THE INVENTION

Modern sun visors utilize catch springs, which produce a particular folding moment and a latching function of the sun visor body in coordination with the axle of the sun visor. In these systems, the catch spring is generally located inside the sun visor body and is fastened to the bearing of a stabilizing frame. Because of this construction, these sun visors exhibit a cross section whose thickness can be calculated by summing the diameter of the axle, the wall thickness of the bearing, and the thickness of the thinnest possible material. The cross section is undesirable by the client, who wants a thinner sun visor.

The objective of the invention is to provide the client with an improved sun visor, in particular, a sun visor with a relatively thin body, which is additionally distinguished by improved utility features.

SUMMARY OF THE INVENTION

In accordance with the invention, the bearing device is now installed outside of the sun visor body both for the folding movement and for the swinging movement. This has the special advantage that the sun visor can now be designed significantly thinner than in conventional practice. Another advantage of the invention is that the catch spring could now likewise be moved outside the body, so that an expensive extra finishing is no longer needed for the surface of the sun visor. Such finishing had to be performed to counteract corrosive loads, especially in the case of plastic sun visors, for which wet steam is used to foam the foaming material. Even the expense for the required lubrication (of the axle and catch spring) is considerably reduced because handling is much easier and placement is improved, so that a smaller amount of lubricant is needed. There are even fewer rejects, because there is fewer opportunities for grease residue to soil the sun visor. Further, a square mirror, which many customers desire, can be used because more free space is available for a larger mirror on the body of the sun visor. Finally, these advantages also have a very positive and favorable effect on the manufacturing process and the quality, which can be noticed in lower manufacturing costs.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
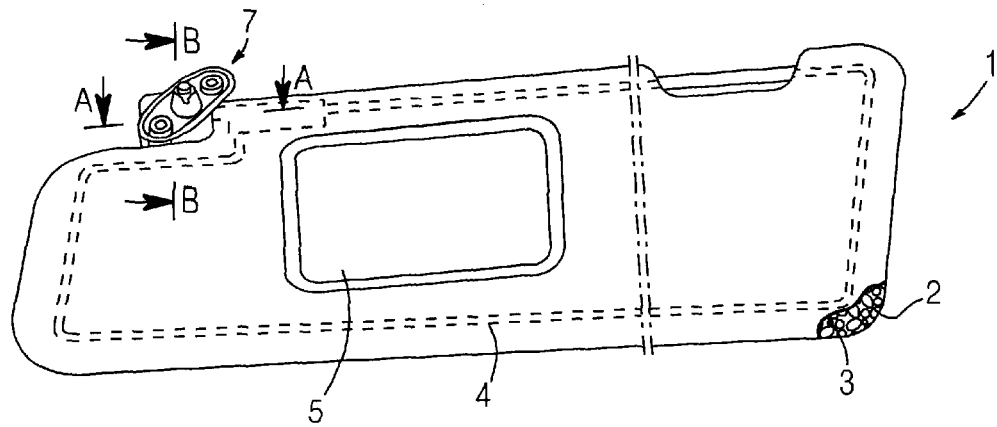
FIG. 1 is a full view of a sun visor.
Figure 2:
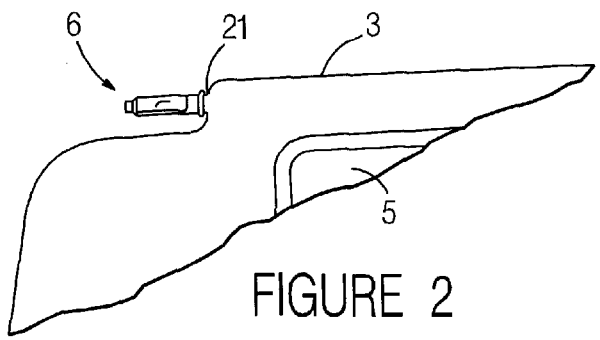
FIG. 2 is a partial view of a corner of the sun visor.
Figure 3:
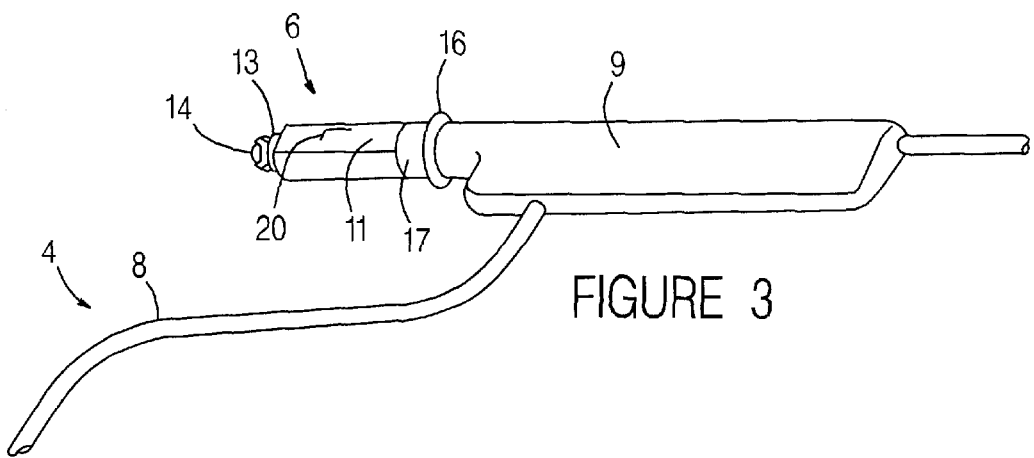
FIG. 3 is a partial view of an axle journal attached to a reinforcing inset for the sun visor.

As shown in FIG. 1, the complete sun visor assembly includes a sun visor body 1 filled with a foamed plastic 2, such as Expanded Polypropylene (EPP), and covered with decorative material 3. The sun visor body I has a stabilizing frame 4, which has a bent shape, and is equipped with a vanity mirror 5. An axle journal 6, which is connected with a bearing device 7 that is yet to be described, projects from a corner of the sun visor body 1, as shown in FIGS. 2 and 3. Here the decorative material 3 surrounds a circular region 21 up to the annular enlargement 16 and displays a clean harmonious edge.

The stabilizing frame 4 consists of a plastic body 9 locally injected on (or even clipped on) a bent wire segment 8. The axle journal 6 is dimensioned to correspond with a catch spring 10 currently in use, so that the required folding/latching moments are achieved. The axle journal 6 exhibits a catching surface 11 on one side with a prescribed length corresponding to the catch spring 10 and a prescribed circular cross section 18. A circular graduation 13 is provided on the rear of the axle journal 6. A piece, that is shaped like a mushroom head 14 and has grooves 49 to provide good clipping, is attached to the front face of the axle journal 6. The axle journal 6 has a chamfer 15 for assembly of the catch spring 10. An annular enlargement 16 on the axle journal 6 serves as limit stop for a bearing housing 22. A clearly visible label for identifying left vs. right parts can be provided by properly recessed lettering 20, on the catching surface 11 for example.

Figure 4:
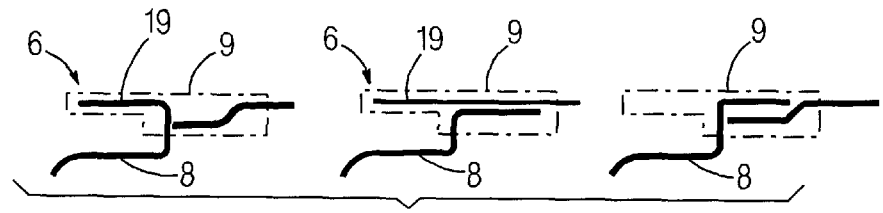
FIG. 4 includes three alternative views of the axle journal.
Figure 5:
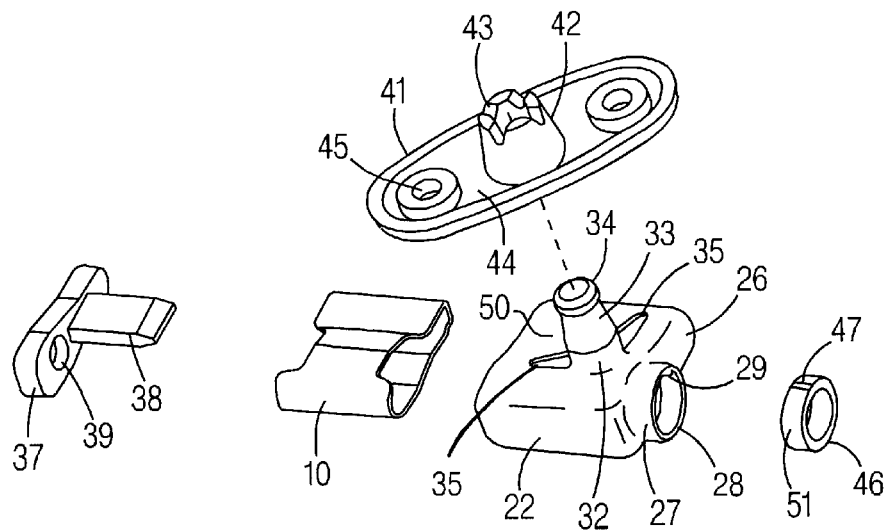
FIG. 5 is an exploded view of the bearing device without axle journal.
Figure 6:
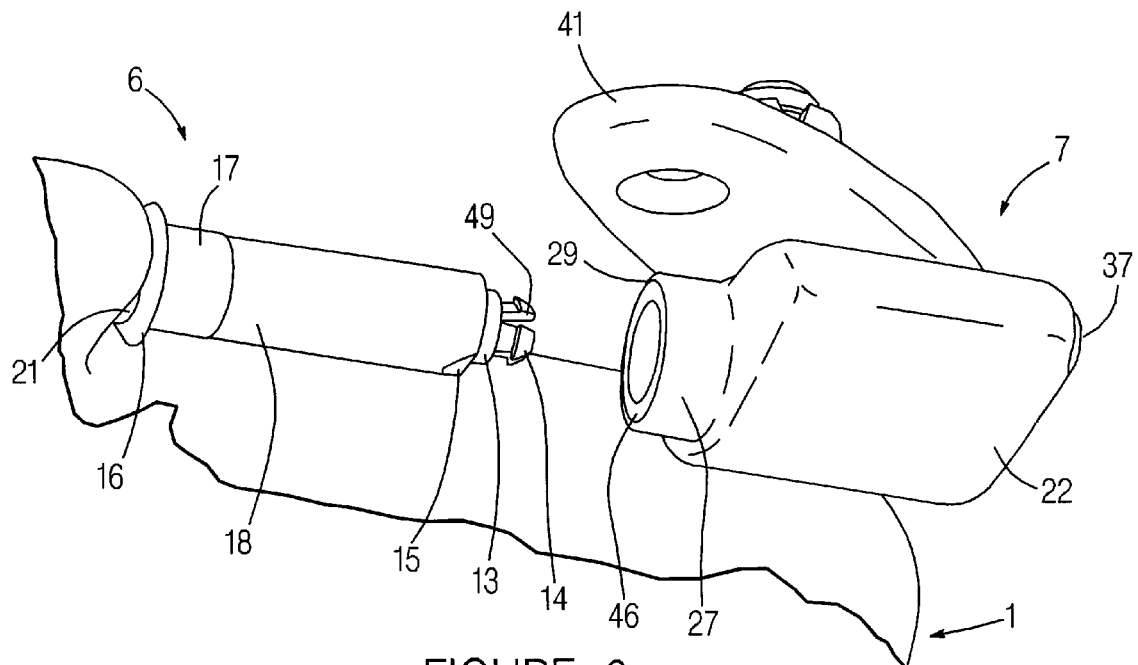
FIG. 6 is an exploded view of the bearing device of FIG. 5 with axle journal.
Figure 7:
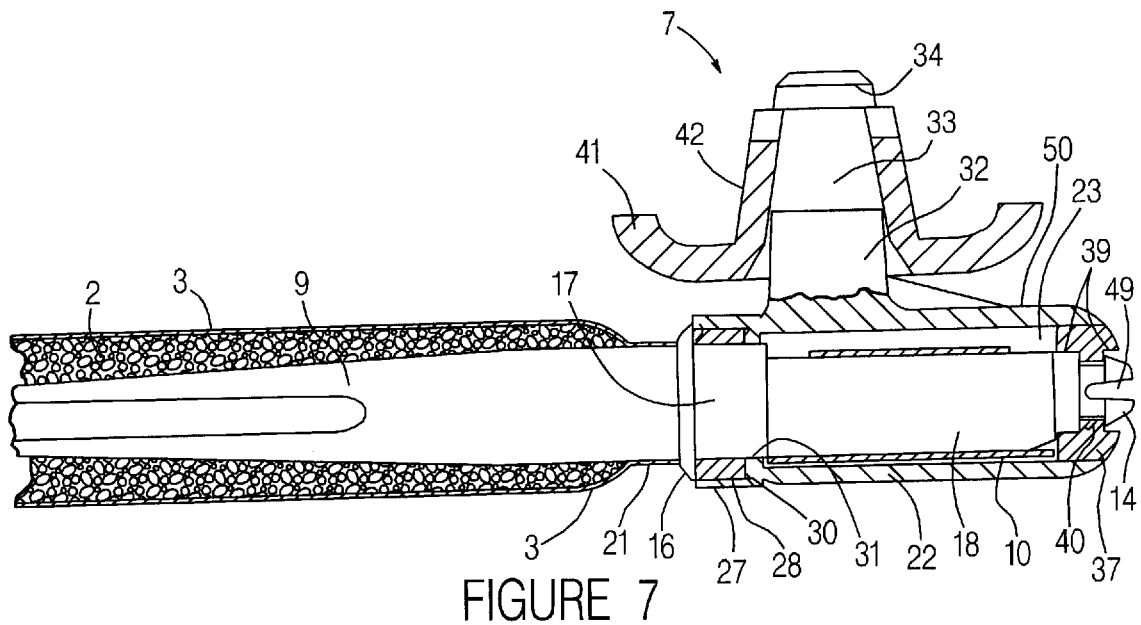
FIG. 7 is a cross-sectional view taken along the line A—A in FIG. 1.
Figure 8:
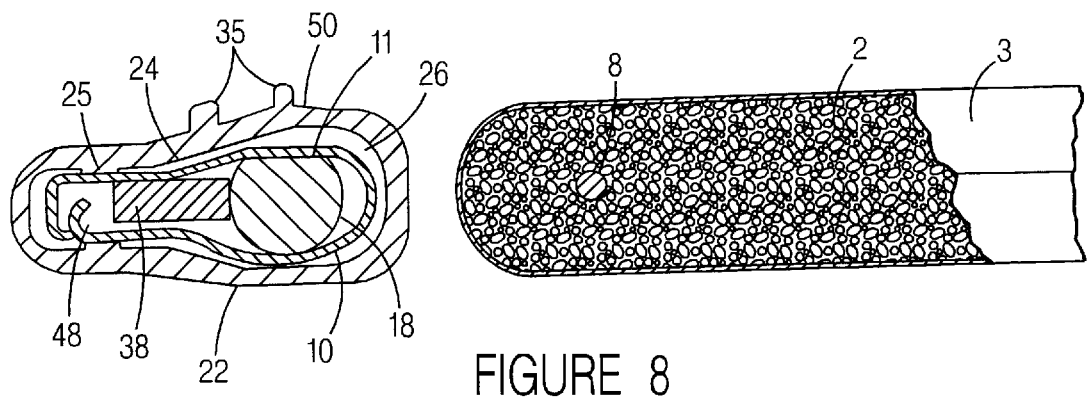
FIG. 8 is a cross-sectional view taken along the line B—B in FIG. 1.

As shown in FIG. 4, an end section 19 of the bent wire segment 8 can be stored into the axle journal 6 in several different ways, should it ever prove necessary to stabilize the axle journal 6 for sturdiness. A frame, manufactured completely out of a plastic injection molded piece, can be used instead of the stabilizing frame 4 described here.

As shown in FIGS. 5–8, the bearing device is composed of several individual parts. First, the bearing housing is a plastic injection molded part with an opening whose cross section matches the shape of the catch spring 10 located in a hollow 23. The hollow 23, which is wide open on one side, features both an opening for assembly and the required functional space for the catch spring 10. Raised parts 25, which support and guide the lower region of the catch spring 10, are provided opposite inner walls 24 of the bearing housing 22. A wall 26 forms an edge of both the bearing housing 22 and the hollow 23, and has a bearing collar 27. A locally raised part 29 is located on a bore 28 of the bearing collar 27. An annular graduation 30 restricts the depth, so that a hole 31 fits the diameter 17 of the axle journal 6 perfectly, to form a first bearing. A swiveling journal 32, whose end is designed with a conical part 33 and a mushroom head 34, is integrally injection molded onto a top 50 of the bearing housing 22. The swiveling journal 32 is stabilized by ribbings 35, which cross the top 50 of the bearing housing 22.

The sealing piece 37 is a plastic injection molded part, which is fit to the shape and dimensions of the hollow 23 and the external shape of the bearing housing 22. A filler piece 38 of the sealing piece 37 fits perfectly with the axle journal 6. The sealing piece 37 features a graduated through-hole 39 and a ring-like graduation 40. A drag-bearing housing 41 is a plastic injection molded part with a conical dome 42, which features grooves 43 on its end. Two mounting holes 45 are located in a base 44 of the drag-bearing housing 41.

An annular piece 46, with a groove 47 locally mounted on an external ring surface 51, fits perfectly in the bore 28 and the diameter 17. The annular piece 46 is made of a thermoplastic polyester elastomer (TPE) and is supposed to operate like a stop limit to prevent the sun visor body 1 of the sun visor from striking the inside roof lining too hard. Another function of the annular piece 46 is the sealing effect against grease leakage.

To manufacture the sun visor assembly, the catch spring 10 is first pushed into the hollow 23 of the bearing housing 22. A lubricant can now be applied to the catch spring 10, if required. The sealing piece 37 is then pressed into the hollow 23 of the bearing housing 22. In this connection, the filler piece 38 guides itself into an open area 48 of the spring arm, so that the catch spring 10 is secured against tipping, wobbling, and the like. The assembly of the drag-bearing housing 41 can occur next, and the annular piece 46 can be pressed into the bearing collar 27 of the bearing housing 22. The groove 47 connected with the raised part 29 will prevent rotation. The complete bearing device 7 is then pressed onto the axle journal 6 until the mushroom head 14 locks into the hole 39 and the ring-like graduation 40 of the sealing piece 37. Rotating bearings have now been created, namely by the diameter 17 and the annular graduation 30 of the bearing housing 22, and also by the circular graduation 13 and the through-hole 39 of the sealing piece 37. The sun visor body 1 of the sun visor is thereby axially fastened and can be folded and swiveled. Because the catch spring 10 is attached outside the sun visor body 1, the possibility of disposal by means of recycling is another advantage of the invention, as well as the option of more rapid refinishing, exchange, and the like.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A sun visor assembly for a vehicle comprising:

a sun visor body; and a bearing device including an axle journal having a catching surface, the axle journal fastened to and projecting from a corner of said sun visor body, means in said bearing device for engaging the catching surface on the journal to maintain said visor body in an unused position and prevent unintentional folding of said visor body to a first use position, a bearing housing having a swiveling journal, a drag-bearing housing adapted to be mountable to the vehicle, a first fastening mechanism operable to axially fasten said bearing housing to said axle journal, and a second fastening mechanism operable to axially fasten said drag-bearing housing to said swiveling journal, wherein said bearing device enables said sun visor body to fold from said unused position to said first use position and to swivel said sun visor body into a second use position.

2. The sun visor assembly of claim 1 wherein said first fastening mechanism includes a bearing collar located at one end of said bearing housing, a sealing piece with a hole located at another end of said bearing housing, and a mushroom head connected to said axle journal, and wherein said bearing collar corresponds to said axle journal and said mushroom head engages with said hole to axially fasten said bearing housing to said axle journal.

3. The sun visor assembly of claim 2 wherein said second fastening mechanism includes a conical part and mushroom head connected to said swiveling journal, and an inner core and a conical dome connected to said drag-bearing housing, and wherein said conical part corresponds with said inner core and said mushroom head engages with said conical dome to axially fasten said drag-bearing housing to said swiveling journal.

4. The sun visor assembly of claim 2 further including a catch spring mounted within said bearing housing having arms to clamp said axle journal.

5. The sun visor assembly of claim 4 wherein said sealing piece includes a filler piece engaging between said arms of said catch spring.

6. The sun visor assembly of claim I wherein said bearing device is injection molded with plastic material.

7. The sun visor assembly of claim 1 further comprising a stabilizing frame to stiffen said sun visor body, said stabilizing frame being integrally formed with said axle journal.

8. The sun visor assembly of claim 7 wherein said stabilizing frame includes a bent wire segment.

9. The sun visor assembly of claim 8 wherein an end section of said bent wire segment is stored within said axle journal.

10. The sun visor assembly of claim 1 wherein said bearing housing includes a limit stop engaging said axle journal.

11. The sun visor assembly of claim 10 wherein said limit stop includes an annular piece installed tightly into said bearing housing.

12. The sun visor assembly of claim 11 wherein said annular piece fits into a bore of a bearing collar.

13. The sun visor assembly of claim 1 wherein said axle journal includes an annular enlargement engageable with said bearing housing.

14. The sun visor assembly of claim 1 wherein said sun visor body is blow molded with plastic material.

15. The sun visor assembly of claim 1 wherein said sun visor body is injection-molded with plastic material.

16. The sun visor assembly of claim 1 wherein said sun visor body is foamed with plastic material.

* * * * *